Oct. 25, 1949.   I. D. VASSAR   2,485,793
BOAT TRAILER
Filed May 3, 1948   3 Sheets-Sheet 1
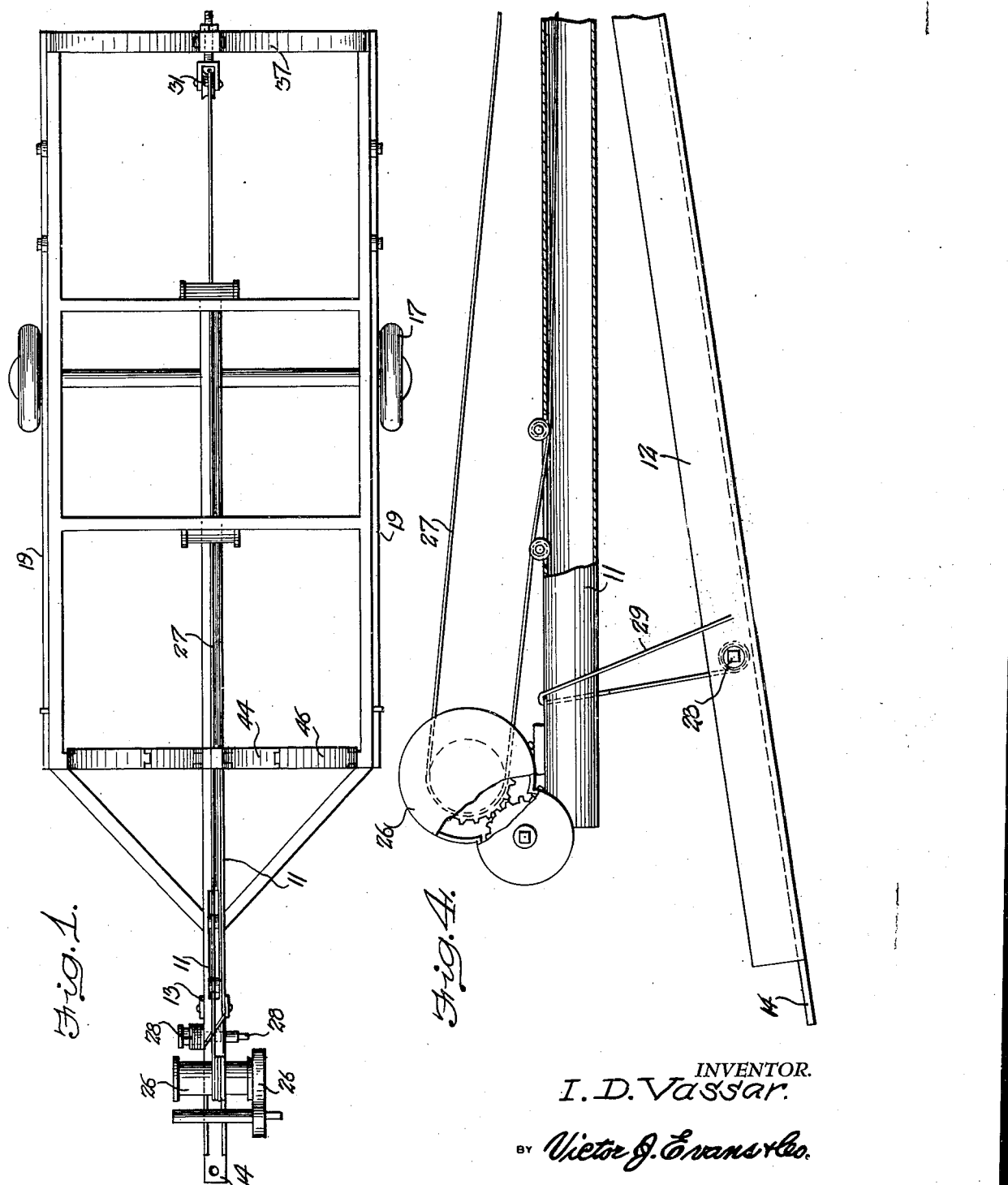
INVENTOR.
I. D. Vassar.
BY Victor J. Evans & Co.
ATTORNEYS Oct. 25, 1949.    I. D. VASSAR    2,485,793
BOAT TRAILER
Filed May 3, 1948    3 Sheets-Sheet 2
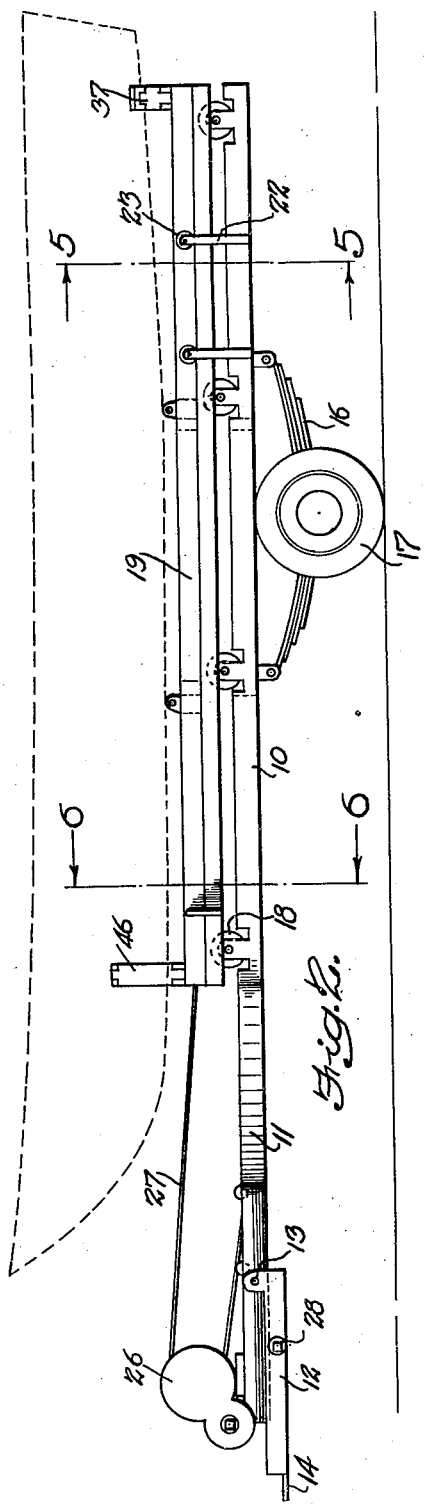
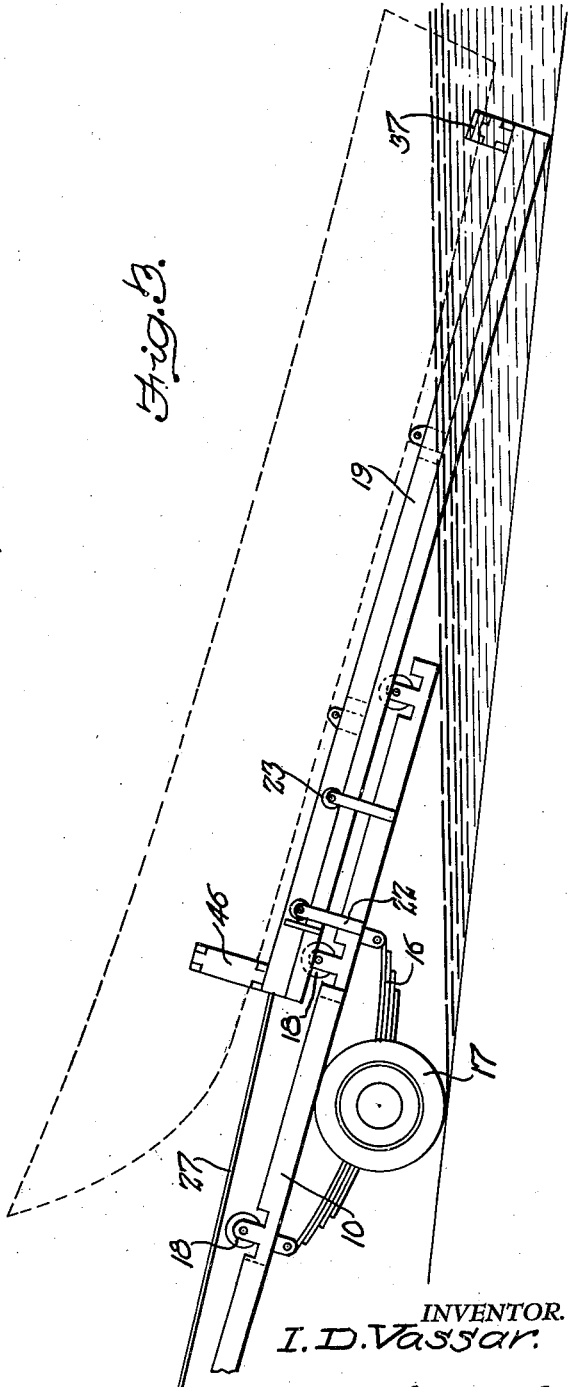
INVENTOR.
I. D. Vassar
BY Victor J. Evans & Co.
ATTORNEYS

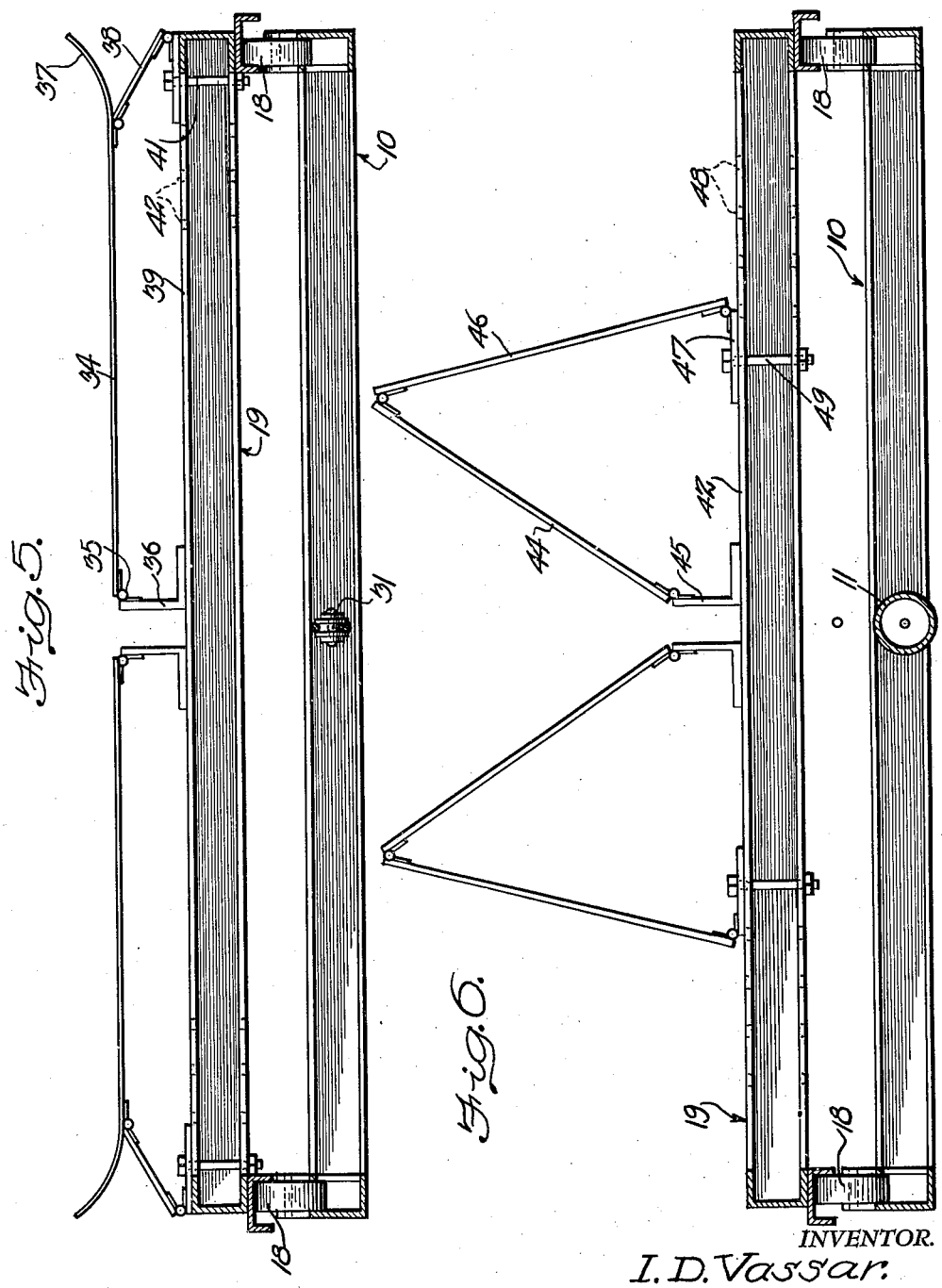

Patented Oct. 25, 1949

2,485,793

UNITED STATES PATENT OFFICE 2,485,793

BOAT TRAILER

Ira D. Vassar, Perkins, Okla.

Application May 3, 1948, Serial No. 24,709

4 Claims. (Cl. 214—85)

This invention relates to boat trailers.

It is an object of the present invention to provide a loading device associated with a boat trailer whereby the boat can be easily drawn onto the trailer or released from the same by the rearward extension of a supporting carriage or frame which can be longitudinally extended rearwardly of the main trailer frame or drawn forwardly to pull in the boat and wherein there is provided adjustable supports for the bottom of the boat in order that the carriage can be adapted for different boats having different side shapes.

Other objects of the present invention are to provide a boat trailer with a loading carriage which is of simple construction, easy to manipulate, inexpensive to manufacture and efficient in operation.

For other objects and for a better understanding of the invention, reference may be had to the following detailed description taken in connection with the accompanying drawing, in which Fig. 1 is a top plan view of the trailer embodying the features of the present invention.

Fig. 2 is a side elevational view of the trailer as connected to a vehicle and with the carriage for the boat extended over the main frame to support the boat.

Fig. 3 is a fragmentary side elevational view of the trailer with the boat carriage extending rearwardly into the water for the purpose of receiving or releasing the boat.

Fig. 4 is a fragmentary and side elevational view of the front part of the trailer and showing the adjusting mechanism for the carriage and for the hitch.

Fig. 5 is a transverse sectional view taken on line 5—5 of Fig. 2.

Fig. 6 is a transverse sectional view taken on line 6—6 of Fig. 2 with the boat supporting pieces raised.

Referring now to the figures, 10 represents a main trailer frame having a forwardly extending tongue 11 to which a hitch member 12 is pivoted as indicated at 13. The hitch member has a tongue 14 for the connection of the trailer with the automobile or other vehicle. The rear of the frame is supported on leaf springs 16 having wheels 17 connected thereto. On the main frame 10 there are disposed along the opposite sides of the same a plurality of supporting wheels 18 on which a boat carriage 19 is extended when pulling the boat onto the main trailer frame 10 or when extending the carriage rearwardly for the removal or the receiving of the boat.

Along the sides and at the rear of the main frame are upwardly extending portions 22 having wheels 23 thereon for engaging the carriage to prevent the carriage from tilting upwardly from the rear of the main frame. The wheels 23 bear against the sides of the carriage 19 and hold the carriage in place on the main frame.

On the tongue 11 is a winch device 26 which has a cable 27 connected to the carriage 19 to pull the carriage onto the trailer frame 10 or to release the same for the purpose of lowering the boat into the water as illustrated in Fig. 3.

In order to permit the main trailer 10 to tilt rearwardly for the carriage to engage at its rear end with the ground as shown in Fig. 3, the hitch member 12 is adjustably connected through a small winch 28 with the tongue 11. The winch 28 has a cable 29 as shown in Fig. 4 which extends over the forward end of the tongue and connects with the hitch member 12.

The cable 27 is connected through an adjustable pulley 31 on the rear end of the carriage 19.

Referring now to Fig. 5, there is shown supporting arms 34 hinged as at 35 to upstanding brackets 36. The outer ends of the arms 34 are bowed upwardly as indicated at 37 to receive the sides of the boat adjacent the rear end of the boat. The bowed upper ends are supported by a hinged bracket construction 38 which is adjustably connected to a transverse frame 39. By removing a retaining bolt 41, the hinged adjustable bracket 38 can be secured at any one of several positions as permitted by the extension of the bolt through any one of a series of holes 42 in the transverse member 39. Accordingly, the supporting member 34 can be elevated and adapted to benefit the side of the boat at the rear of the same.

A similar supporting bracket arrangement is provided at the front of the carriage as shown in Fig. 6. Supporting arms 44 are hinged to upstanding brackets 45 on a transverse frame piece 46. The outer ends of the arms or supporting members 44 have connected thereto a hinged brace 46 which is connected to a base plate 47 that engages with the top of the transverse member 42. On the transverse member there is provided a series of adjusting holes 48 into which a retaining bolt 49 can be extended for holding the plate 47 on the transverse member. By this arrangement, the angle of inclination of the supporting member 44 can be adjusted so as to adapt the same to the particular boat being carried.

While various changes may be made in the detail construction, it shall be understood that such changes shall be within the spirit and scope of the present invention as defined by the appended claims.

I claim:

1. A boat trailer comprising a main frame having a wheel arrangement connected to the same and a forwardly extending tongue portion, a boat carriage adapted to support a boat connected to the main frame for longitudinal adjustment therealong, said boat carriage having a transverse member having a plurality of adjustable holes therein, bracket means fixed to said transverse member centrally thereof, supporting arms connected to said bracket and adjustable brackets connected to said supporting arms for supporting the boat on said carriage, a winch device connected to the tongue and to the boat carriage for drawing the same onto the main trailer frame or for releasing the same rearwardly for the purpose of receiving the same or releasing a boat therefrom.

2. A boat trailer comprising a main frame having a wheel arrangement connected to the same and a forwardly extending tongue portion, a boat carriage adapted to support a boat connected to the main frame for longitudinal adjustment therealong, said boat carriage having a transverse member having a plurality of adjustable holes therein, bracket means fixed to said transverse member centrally thereof, supporting arms connected to said bracket and adjustable brackets connected to said supporting arms for supporting the boat on said carriage, a winch device connected to the tongue and to the boat carriage for drawing the same onto the main trailer frame or for releasing the same rearwardly for the purpose of receiving the same or releasing a boat therefrom, and angularly adjustable supporting members on the boat carriage for supporting the bottom of the boat and being adjustable to adapt the members to the shape of the particular boat being handled.

3. A boat trailer comprising a main frame having a wheel arrangement connected to the same and a forwardly extending tongue portion, a boat carriage adapted to support a boat connected to the main frame for longitudinal adjustment therealong, said boat carriage having a transverse member having a plurality of adjustable holes therein, bracket means fixed to said transverse member centrally thereof, supporting arms connected to said bracket and adjustable brackets connected to said supporting arms for supporting the boat on said carriage, a winch device connected to the tongue and to the boat carriage for drawing the same onto the main trailer frame or for releasing the same rearwardly for the purpose of receiving the same or releasing a boat therefrom, and a hitch member pivotally connected to the tongue of the main frame, and an adjustable mechanism extending between the hitch member and the tongue whereby to permit the release of the tongue from the main frame from the hitch member while the hitch member remains connected to a vehicle and for causing the hitch member and the tongue of the main frame to be brought together to tilt forwardly the main frame over the supporting wheels.

4. An adjustable support for boats comprising a boat carriage having a transverse member with a series of adjusting holes therein, a bracket extending upwardly adjacent the center of the transverse member, supporting arms pivotally connected to the upstanding brackets, and adjustable brackets comprising an arm hingedly connected to the outer end of the supporting arm and a base plate hingedly connected to the last mentioned arm, and clamping bolts adapted to be extended through any one of the series of holes on the transverse member for securing the bracket base plate thereto.

IRA D. VASSAR.

REFERENCES CITED

The following references are of record in the file of this patent:

UNITED STATES PATENTS

| Number | Name | Date |
|---|---|---|
| 1,870,573 | Kuchar | Aug. 9, 1932 |
| 1,941,400 | Johnson | Dec. 26, 1933 |
| 2,332,991 | Commire | Oct. 26, 1943 |
| 2,389,338 | Zorc, Jr. | Nov. 20, 1945 |

FOREIGN PATENTS

| Number | Country | Date |
|---|---|---|
| 446,483 | Great Britain | Apr. 30, 1936 |
| 496,549 | Great Britain | Nov. 28, 1938 |